United States Patent
Fazi

(10) Patent No.: US 8,825,224 B2
(45) Date of Patent: Sep. 2, 2014

(54) ENGINE IDLE PROTECTION SYSTEM

(75) Inventor: Peter Fazi, Lachine (CA)

(73) Assignee: Directed, LLC, Vista, CA (US)

( * ) Notice: Subject to any disclaimer, the term of this patent is extended or adjusted under 35 U.S.C. 154(b) by 199 days.

(21) Appl. No.: 13/430,460

(22) Filed: Mar. 26, 2012

(65) Prior Publication Data

US 2013/0079952 A1    Mar. 28, 2013

Related U.S. Application Data

(60) Provisional application No. 61/468,002, filed on Mar. 26, 2011.

(51) Int. Cl.
| | |
|---|---|
| *G05D 1/00* | (2006.01) |
| *F02N 11/08* | (2006.01) |
| *F02D 17/04* | (2006.01) |
| *B60R 16/00* | (2006.01) |
| *G06F 17/00* | (2006.01) |
| *F02D 45/00* | (2006.01) |

(52) U.S. Cl.
CPC ............ *F02D 45/00* (2013.01); *F02N 11/0807* (2013.01); *F02D 17/04* (2013.01); *B60R 16/00* (2013.01); *G06F 17/00* (2013.01)
USPC ............................................................. 701/2

(58) Field of Classification Search
None
See application file for complete search history.

(56) References Cited

U.S. PATENT DOCUMENTS

| | | | |
|---|---|---|---|
| 6,718,235 B1 * | 4/2004 | Borugian | 701/1 |
| 2006/0170532 A1 * | 8/2006 | Huntzicker | 340/5.54 |
| 2008/0117079 A1 * | 5/2008 | Hassan | 340/901 |
| 2011/0068895 A1 * | 3/2011 | Gee et al. | 340/5.67 |

* cited by examiner

*Primary Examiner* — Thomas Tarcza
*Assistant Examiner* — Adam A Alharbi
(74) *Attorney, Agent, or Firm* — KC Bean, Esq.

(57) ABSTRACT

An automated vehicle shutdown and user notification method and device for shutting down an engine in a vehicle having a passive keyless entry and start ignition system where the engine has unintentionally been left running by the user is disclosed. In one aftermarket embodiment, the method is implemented in an aftermarket remote start interface module. The module comprises a micro-controller, a memory, a vehicle data bus connector that provides for interface through the vehicles onboard diagnostic (OBDII) port to the vehicle data bus. The system includes a remote start module having a radio frequency transceiver and a cellular telephone transceiver, and provides audible, visual and electronic notifications that the vehicle has been left running and that the engine will be shut off unless the shutdown sequence is deactivated. If the shutdown fails by any malfunction, the system will go into an alternative notice mode.

10 Claims, 5 Drawing Sheets

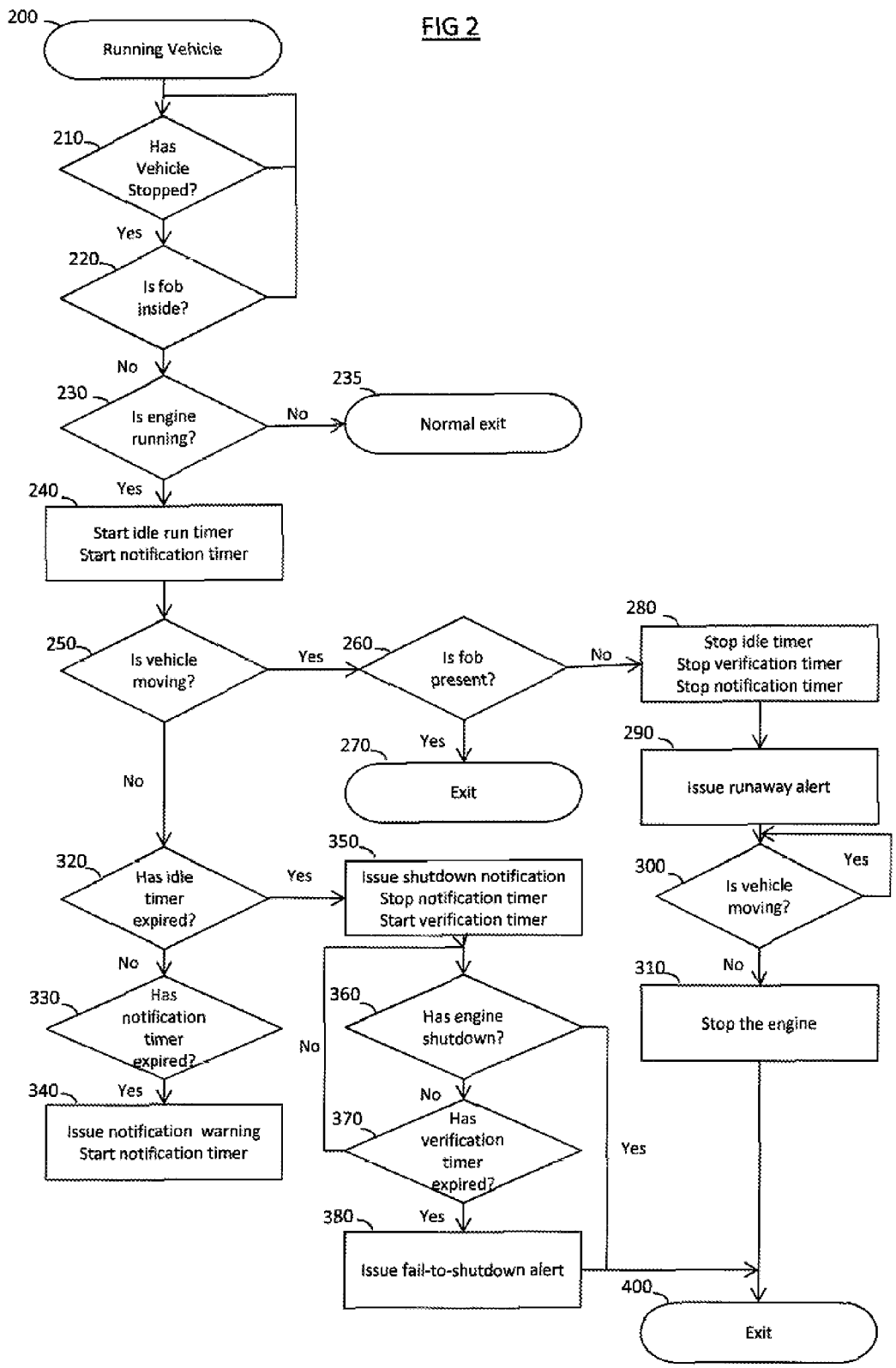

FIG 3

Method for automated engine idle shutdown and user notification for a vehicle with PKES

| Step 1 | Monitoring the vehicle engine on/off status |
| Step 2 | Monitoring the movement of a vehicle |
| Step 3 | Monitoring a vehicle for the presence of a PKES system fob |
| Step 4 | Setting an idle run timer when the PKES system fob is not present |
| Step 5 | Setting a user notification timer to provide an engine run notice when the PKES system fob is not present |
| Step 6 | Monitoring an idle run timer and a user notification timer |
| Step 7 | Providing a digital engine shutdown message to the vehicle if no fob is present, no motion is detected, and idle run timer expired |
| Step 8 | Providing a user notification of idling if no fob is present and user notification timer expired |

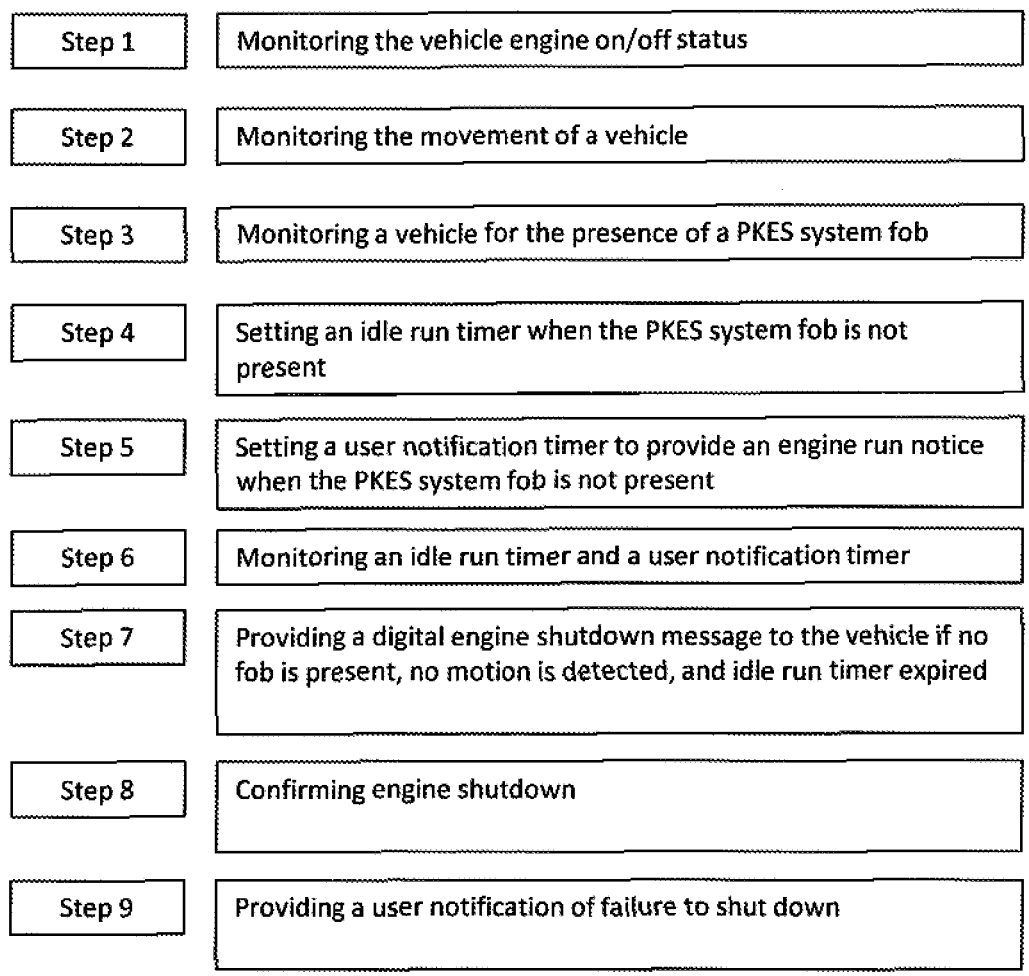

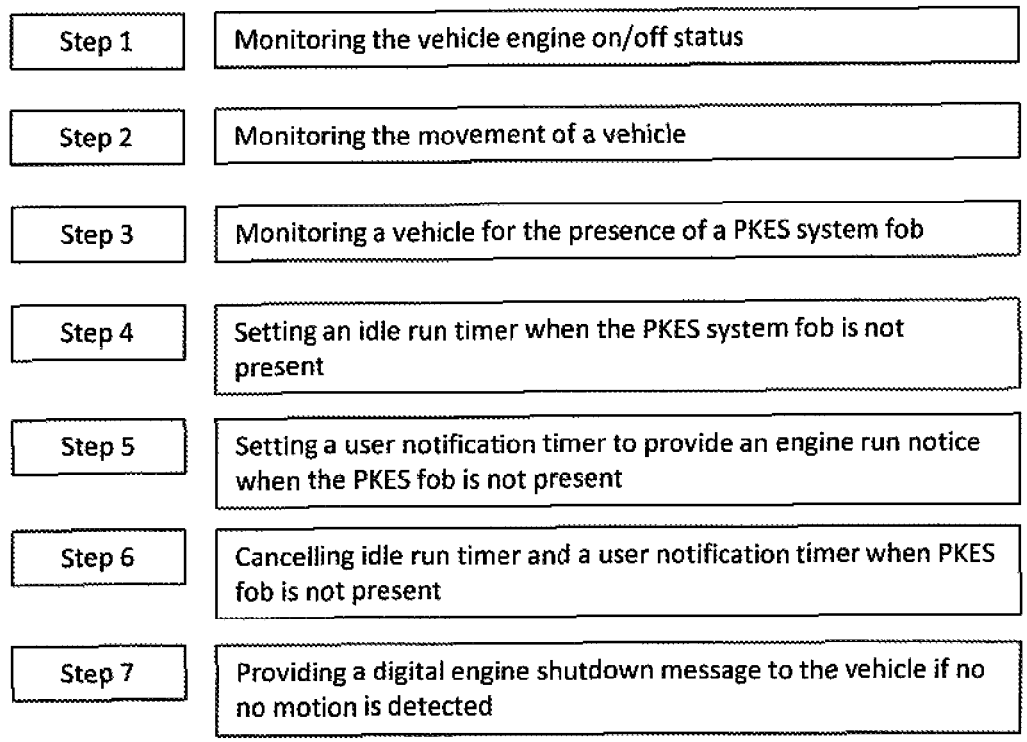

ENGINE IDLE PROTECTION SYSTEM

CROSS-REFERENCE TO RELATED APPLICATIONS

This application claims the benefit of and is a continuation of U.S. Provisional Patent Application Ser. No. 61/468,002 filed on Mar. 26, 2011.

BACKGROUND AND SUMMARY OF THE INVENTION

The present invention is in the field of and relates to vehicle safety shut down for vehicles equipped with a passive keyless entry and start (PKES) systems. The described functionality is designed to prevent accidental and unintended prolonged idling of an engine in a vehicle equipped with a PKES system.

Modern vehicle incorporate a number of sophisticated electronics control systems to enhance vehicle functions and features and to provide added convenience to users. A primary control system of importance to manufacturers and owners is the access and engine start authorization system. Vehicle engine starter systems have advanced from simple starter motor designs using a physical ignition key to close a circuit to power the starter and crank the engine, to more sophisticated remote start systems with digitally encoded RF signaling to ignition systems, to more advanced keyless transponder based push to start systems. Recently, car manufacturers have introduced Passive Keyless Entry and Start systems that allow users to open vehicle doors and start their cars while having their car keys in their pockets. This feature is very convenient for the users since they don't have to search for their keys when approaching or preparing to start the car. One of the first passive keyless entry systems of this nature was disclosed in U.S. Pat. No. 4,942,393 issued to Warakasa et al. Since then, similar systems have been developed by a number of manufacturers including those disclosed in U.S. Pat. Nos. 5,973,611; 5,838,257 and 5,552,641.

Push-button keyless entry and start systems are very convenient and simple to use. A small radio frequency transmitter or transponder, generally built into a fob that is in the possession of the user, and which is activated with motion by the user, transmits a short range radio signal with an encrypted digital key. A series of LF (low frequency 125 kHz) antennas are located both inside and about the vehicle. External antennas are located in the vehicle door handles. As the user moves about with the fob, the motion activates the fob transmitter to transmit a short rang RF signal. If the fob is in proximity of the vehicle, generally three to six feet, receivers in the vehicle will receive the digital key transmitted by the fob and if the transmitted key is properly authenticates by the receiver the vehicle will passively unlock the vehicle door. The driver enters the vehicle and positions behind the wheel, with the key fob in the driver's possession. The vehicle's system recognizes the presence of the fob, and the driver only needs to depress the brake pedal, and push a button on the control panel to start the motor. The transmission of the digital key conveniently allows the driver to keep the key fob in their pocket when unlocking, locking and starting the vehicle. A signal from a fob with an invalid or unauthorized digital key will not allow for the unlocking of the doors or starting of the vehicle, and can trigger an alarm system or even disable the engine. This way, if someone enters the car without a valid key fob, the vehicle will remain secured.

The method of locking vehicle doors upon exit varies among designs. When leaving a vehicle equipped with a PKES key system, the vehicle doors are locked by either pressing a button on one of the door handles, touching a capacitive area on a door handle, or by simply walking away from the vehicle and distancing the fob from the proximity of the vehicle so that the doors lock when the signal is out of range of the antenna.

Although PKES systems are convenient, there remains a significant limitation with current PKES systems when it comes to shutting down the vehicle engine. In current systems, shutting off the engine is accomplished by pressing the start/stop button, usually located on the dash of the vehicle. Generally, the engine will remain running unless the start/stop button is depressed, even when the driver has exited the vehicle and removed the fob from proximity of the vehicle. Often, in modern vehicles with low noise, the driver cannot hear the motor, or the driver may be distracted when exiting the vehicle causing the driver to fail to depress the start/stop button and leaving the vehicle engine running.

In addition to the obvious adverse environmental impacts due to excess release of emissions, leaving a vehicle idling unattended may present a safety concern. Long term idling of the engine within a confined space, such as a within a garage attached to a dwelling, can lead to a rise in carbon monoxide levels that might potentially cause asphyxiation, brain damage or death to individuals exposed to high concentrations of carbon monoxide inside the dwelling.

To mitigate the risk of injury or death from unintended engine run in a confined space, and to reduce unintended emissions or a waste of fuel, disclosed is a new method and device for vehicles with PKES systems that is available for aftermarket installation. The engine idle protection system of the present invention is designed to work with vehicles that are factory equipped with push to start PKES systems. The current invention may be implemented after the original purchase of the vehicle or during manufacturing of the vehicle.

A number of systems have been developed to automatically shut down an engine. For example, U.S. Pat. No. 5,219,413 discloses a system that uses an infrared sensor to monitor temperature levels within the cabin of a vehicle which is presumed to represent the presence of a driver. There are other known systems primarily intended start/stop of vehicles that are being driven in heavy traffic conditions, and if a driver stops at a traffic light or other extended period during congested traffic condition, the engine is automatically shut off and then re-started to allow continued driving when the light has changed or when traffic congestion has eased. An example of such a system is U.S. Pat. No. 7,458,353. These systems have a number of limitations and fail to properly monitor all driving conditions to appropriately shutdown or prevent the shutdown of the motor under specified conditions. For example, it may be desirable to remote start a vehicle and allow for the idling of the engine without the presence of the driver.

U.S. patent application Ser. No. 12/708,981 also discloses an anti-idle control system and method of controlled engine shut down. However that system is limited in that it is simply timer base and relies on mechanical relays inserted into the ignition wire to shut down the engine. This is of no assistance in PKES system. Further the Dupuis et al application relies on a physical key being in the ignition in the on position and collection of multi-signal consensus process that requires a resolution of all primary sensor signals to be positive in order to support the engine shutdown. This is of no added value in a PKES system and will cause a number of engine runs when not necessary.

In view of the foregoing background, the present invention overcomes the limitations of the prior art by providing for an automated vehicle shut down method and device for shutting down a vehicle having a PKES ignition system where the engine has unintentionally been left running.

In one aspect of the current invention a method and device is disclosed for providing automatic engine shutdown for vehicles with a PKES system when a driver leaves the vehicle removing the PKES system remote from the proximity of the vehicle and inadvertently leaving the engine running.

In another aspect of the current invention a method and device are disclosed for monitors for the presence of the driver having a fob for a PKES system to determine if the vehicle has been left running unintentionally.

In a third aspect of the invention a method and device is disclosed for providing overriding factory PKES systems to add aftermarket engine shutdown and user notification features.

In yet another aspect of the invention a method and device is disclosed that provides audible, visual and electronic notification to a driving or the driver's electronic device that the vehicle having a PKES system has been left running and that the engine will be shut off unless the shutdown sequence is deactivated. If the shutdown fails by any malfunction, the system will go into an alternative notice mode.

BRIEF DESCRIPTION OF THE DRAWINGS

Embodiments of the present disclosure will be more readily understood by reference to the following figures, in which like reference numbers and designations indicate like elements.

FIG. 2 is a front view flow diagram showing the routine logic of the current invention FIG. 3 is a diagram of the steps of one aspect of the current inventive method.

FIG. 4 is a diagram of the steps of a second aspect of the current inventive method.

FIG. 5 is a diagram of the steps of yet another aspect of the current inventive method.

DETAILED DESCRIPTION OF THE INVENTION

Figure 1:
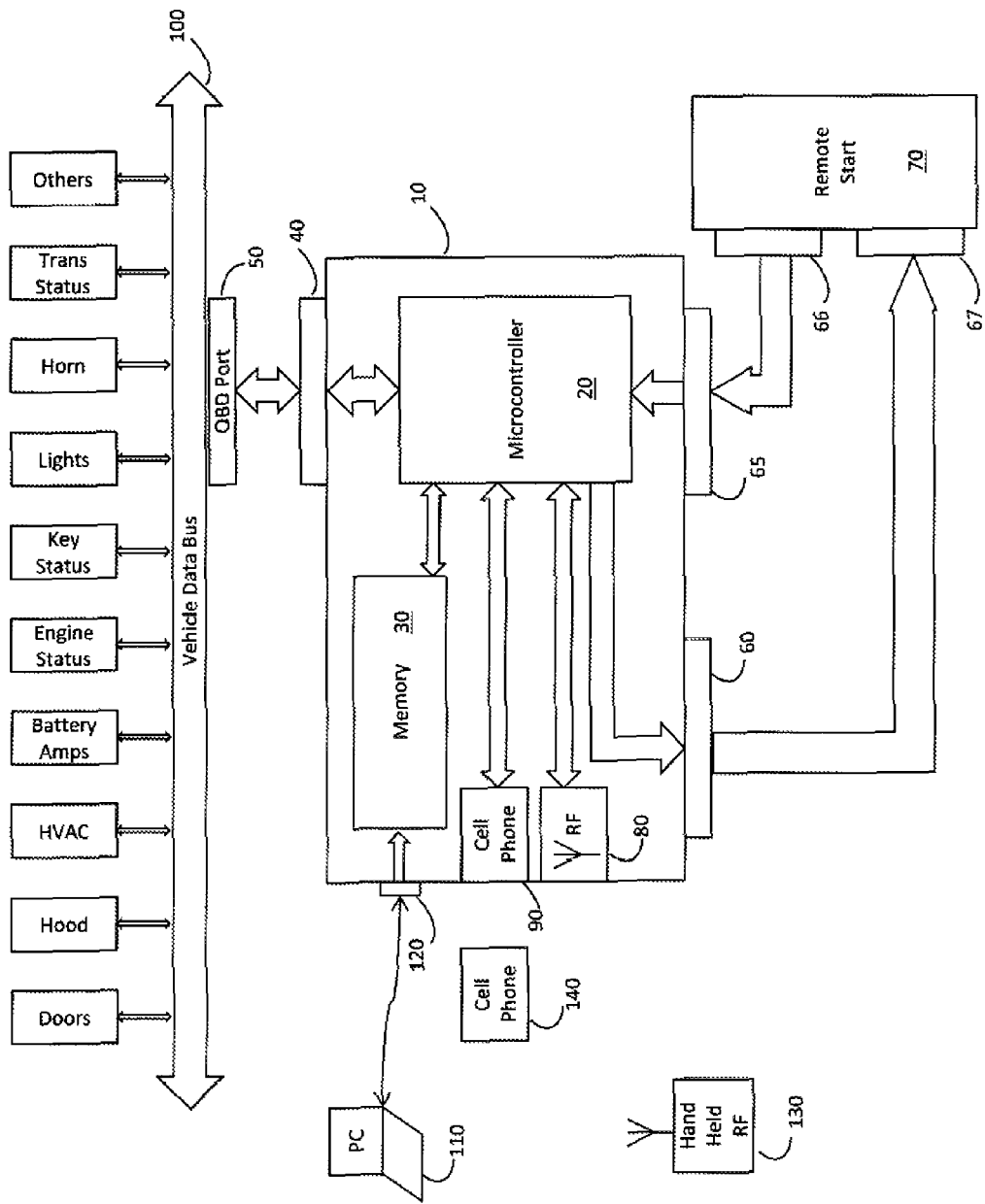
FIG. 1 is a schematic representation of one embodiment of the invention.

The current invention is an automated vehicle shutdown and user notification method and device for shutting down a vehicle having a PKES ignition system where the engine has unintentionally been left running by the user. Now referring to FIG. 1, in one aftermarket embodiment, the method is implemented in an aftermarket remote start interface module 10. The module 10 comprises a micro-controller 20, a memory 30, a vehicle data bus connector 40 that provides for interface with the vehicles onboard diagnostic (OBD) connector 50, connectors 60, 65 that provide for communications with the aftermarket remote start unit 70. Preferably, the module 10 also comprises a radio frequency transceiver 80 and a cellular telephone transceiver 90.

Vehicles having a PKES system incorporate the use of a digital data bus system connecting most devices within the vehicle to an internal microcontroller based network. A number of digital communication standards or protocols have been develop, such as CAN, LIN, MOST or J1850 protocol (all of which are hereby incorporated by reference). Different vehicles may operate on different protocols and have different digital codes that govern the functional commands of the data bus system and thus the vehicle. The module 10 must be programmed with the appropriate protocol and unique digital codes by vehicle to properly work on the vehicle. As a standalone device, the module is flashed with a firmware version specific to the vehicle data bus protocol in which it is installed. Programming is performed using a personal computer 110 or via other digital device through a connector 120 on the module 10. The appropriate digital codes unique to individual vehicles are uploaded to the module memory 30 using Flash.

The module 10 is in communication with various vehicle systems through the vehicle data bus network. Preferably, the module is deployed as a stand-alone module that is interfaced with the vehicle bus system through an OBD connector 50 or other vehicle data bus connection. In the disclosed embodiment, the module 10 is in communication with an analog aftermarket remote start unit 70 through analog connectors 60, 65, 66, and 67. The microcontroller 20 uses the protocol and digital codes stored in memory to convert analog signals from the remote start unit 70 to digital messages matching the vehicle codes and communicate these digital messages to the vehicle data bus 100 to remotely control certain functions of the vehicle. In some embodiments a hand-held RF transceiver 130 and/or cellular telephone transceiver 140 are used to extend the range of communication with the module 10. The shut-down method can also be implemented within a single microcontroller made part of the vehicle data bus network at the factory or in a more generic multi-functional device, such as fully digital aftermarket or factory installed vehicle security, remote start system, entertainment system or other microcontroller based electronic device.

The connections from the module 10 to the vehicle are 12 volt positive and ground. The connections from the module 10 to the vehicle data bus 100 are CAN High, CAN Low, FTCAN High, FTCAN Low and negative shut down to PKES system. It will be appreciated by one skilled in the art that the installation can be any type of power, ground, and data connection required for the particular vehicle application. The method can also be implemented in a conventional installation with an aftermarket remote starter and data bus interface analog to digital module. For an original equipment embodiment, the method can be deployed within the coding of the vehicle's engine control module or body control module.

The user may activate and deactivate the system through an activation and deactivation sequence. To activate the module the user will remove all keys from the vehicle and close all doors while the engine is running. To deactivate the module the user will open a door, remote start the vehicle, shut down the vehicle, use the PKES system to restart the vehicle then drive.

The module 10 monitors several vehicle parameters status indicators that are communicated on the vehicle data bus 100 such as engine run status, temperatures, as well as the presence of the key fob within the vehicle. However, the module is capable of monitoring, and if the proper functional digital code is known and programmed into memory, any digital message communicated on the vehicle data bus received or sent to the bus. The module 10 will receive through the vehicles data bus system digital messages when the PKES system detects the presence of the RFID fob in the car. Alternatively, the module may include a direct RF link 80 with the RFID fob. When the RFID fob is present in proximity the vehicle, it transmits and RF message to a receiver in the vehicle that is communicated on the data bus indicating its presence of the fob within the proximity of the vehicle. The module 10 monitors digital messages that are communicated on the data bus 100, and detects the fob presence message in this manner. If the RFID fob is leaves the proximity of the vehicle the fob present message is no longer communicated on the data bus system 100 and is not detected by the module 100. If the engine is running, the module starts a timer. The module 100 continues to monitor the time the engine runs when the RFID fob is not detected in proximity of the vehicle. If the vehicle is left idling for more than the desired predefined run time (for example 1 to 5 minutes) without the RFID fob detected, the module will generate a digital engine shut down message and communicate this message on the data bus 100. The vehicle's engine control module will read this message and shut off the engine. In an alternative embodiment, the module may directly send an RF interrogation signal to the local environment seeking the presence of the RFID fob Additionally, the module can provide alerts to the driver indicating the engine is running. Upon detecting that the engine is running in the absence of the RFID fob, the module will start a timer with a programmable delay in the range of 1 min to 5 min (Idle run timer). It will be appreciated by one skilled in the art that any time period can be programmed either by default or by the user, such as thirty seconds or two minutes. Every preset time period, for example one minute, the vehicle is idling without the RFID fob detected, the module will generate and send a digital message on the data bus to honk the horn and flash the vehicle lights to alert the user that the RFID key is no longer present in the vehicle and that the car is idling. The horn sequence or tone may be unique or programmed by the user to represent the particular vehicle. For example the horn may have one long honk and two short honks. In another embodiment, the module may communicate a message to other devices such as a smart phone, email, SMS, MMS, or cellular phone network or other wireless communications means to provide messages to the driver that the vehicle is running without the presence of the RFID fob the vehicle is running. This communication can be performed by any digital communications standard that is programmed into the memory of the unit.

Now with reference to FIG. 2, disclosed is the programming logic used in the microcontroller to implement the method and device of the current invention. The module continuously monitors messages communicated on the vehicle data bus, with respect to FIG. 2, the vehicle engine run state is monitored. If the vehicle engine is running the module continues to monitor. If the engine has stopped, the module will look for data messages on the data bus indicating the present of the fob. If there is not a fob present message being communicated on the bus, the module will query the bus to determine the current run status of the engine 230. If the engine is in the off state, the program will exit and reset 235. If the engine is running, the module will start an idle run timer and a start notification timer 240. To ensure against false shut downs the module then seeks data on the bus indicative of movement of the vehicle, for example engine RPM, speed data or motion sensor data 250.

If the vehicle is moving, the module again interrogates the bus for data messages indicating the presence of the fob 260. If the fob is present, the routine is exited 270, as it is assumed the authorized driver has returned to the vehicle. If a fob present message is not retrieved from the bus the driver may have returned to the car without his fob or this could indicate a theft of the vehicle has occurred. The routine will stop all timers previously set 280 and issue a runaway vehicle or theft alert 290. If the driver has inadvertently left the fob behind, or if a theft has occurred, the routine continues to monitor for motion of the vehicle 300. The method is disabled if the vehicle is in motion so there is no risk that the vehicle will shut off while driving regardless of the RFID fob being present in the vehicle or not. If the vehicle comes to a stop, the routine will generate and send a stop engine data message to the bus to prevent theft of the vehicle 310, and then exits the routine 400.

If the vehicle is not moving at earlier step 250 of the routine, the routine will continue to monitor the idle run time timer previously set at step 240 to determine if they have expired 320. If the idle run timer has not expired, the routine will determine if the notification timer has expired 330. If the notification time has expired then the routine will issue a notification warning 340 according to present notification parameters. For example, the vehicle horn and lights will honk and a local RF message will be transmitted to the hand held transceiver. Additionally, the system may generate a phone or SMS message using a phone number that is programmed into memory. At step 340, the routine also resets the notification timer. This allows for multiple notifications to be provided if the driver does not return to the vehicle.

If idle run timer, at step 320 of the route, has expired, the module will generate and issue a engine shut down warning notification (Shutdown notification) 350, which is distinct from the idling notification discussed above at 340, and the routine will generate and issue to the vehicle data bus a digital command to shut the vehicle's engine down. At the same time, the routine will start the pre-programmed verification timer to verify the status of the engine. The routine will monitor the engine to confirm it has shut down within the time set with the verification timer 360. If the engine does shut down, the routine if exited 400. If the engine continues to idle upon expiration of the verification timer 370, the routine will generate and issue a "fail-to-shut-down" alert notification, by all means available: long horn, flashing headlights, parking lights, smart phone, etc. 380.

If the engine is shut down by the user at any time during the routine, the module will stop its current operation and reset its internal state, sending a confirmation message and returning to its normal mode.

FIG. 3 provides for one aspect of the method according to the current invention. Step one is monitoring the on off status of a vehicle engine in a vehicle having a PKES system. As discussed above, monitoring can be done by monitoring data codes that are communicated on the vehicle data bus system. Step one is monitoring the on/off status of a vehicle. Step two is monitoring whether the vehicle is moving. This can be done by reading speed codes on the bus. Step three is monitoring for the present of a PKES system fob. Fob presence is detected by receipt of short range RF signals from the fob that are received by an antenna in the vehicle, converted to a digital code and transmitted on the data bus. Step four comprises setting an idle run timer when the PKES system fob is not present. Step five comprises setting a user notification timer to provide, when the timer expires, an engine run notice to a user when the PKES system fob is not present. The notification method can be any one of many known methods including RF transmission, cell phone, light flash and horn honk. Step six comprises monitoring an idle run timer and a user notification timer. Step seven consists of providing a digital engine shutdown message to the vehicle if no fob is present, no motion is detected and the idle run timer has expired. Step eight comprises providing a user notification of vehicle idling if no fob is present and the user notification timer has expired.

FIG. 4 provides for a second aspect of the method according to the current invention. Step one is monitoring the on off status of a vehicle engine in a vehicle having a PKES system. Step two is monitoring whether the vehicle is moving. This can be done by reading speed codes on the bus. Step three is monitoring for the present of a PKES system fob. Step four is setting an idle run timer when the PKES system fob is not present. Step five comprises setting a user notification timer to provide, when the timer expires, an engine run notice to a user when the PKES system fob is not present. Step six comprises monitoring an idle run timer and a user notification timer. Step seven comprises providing a digital engine shutdown message to the vehicle if no fob is present, no motion is detected and the idle run timer has expired. Step eight consists of confirming engine shutdown. Step nine comprises providing a user notification of failure to shut down the vehicle.

FIG. 5 is yet another aspect of the method according to the current invention. Step one is monitoring the on off status of a vehicle engine in a vehicle having a PKES system. Step two is monitoring whether the vehicle is moving. Step three is monitoring for the present of a PKES system fob. Step four is setting an idle run timer when the PKES system fob is not present. Step five comprises setting a user notification timer to provide, when the timer expires, an engine run notice to a user when the PKES system fob is not present. Step six comprises cancelling an idle run timer and a user notification timer when PKES fob is not present. And Step seven comprises providing a digital engine shutdown message to a vehicle if no motion is detected.

While the above description has pointed out novel features of the present disclosure as applied to various embodiments, the skilled person will understand that various omissions, substitutions, permutations, and changes in the form and details of the present teachings may be made without departing from the scope of the present teachings.

Each practical and novel combination of the elements and alternatives described hereinabove, and each practical combination of equivalents to such elements, is contemplated as an embodiment of the present teachings. Because many more element combinations are contemplated as embodiments of the present teachings than can reasonably be explicitly enumerated herein, the scope of the present teachings is properly defined by the appended claims rather than by the foregoing description. All variations coming within the meaning and range of equivalency of the various claim elements are embraced within the scope of the corresponding claim. Each claim set forth below is intended to encompass any apparatus or method that differs only insubstantially from the literal language of such claim, as long as such apparatus or method is not, in fact, an embodiment of the prior art. To this end, each described element in each claim should be construed as broadly as possible, and moreover should be understood to encompass any equivalent to such element insofar as possible without also encompassing the prior art.

What I claim is:

1. An engine idle shutdown system for a vehicle having a passive keyless entry and start system having a vehicle user proximity indicator; the engine idle shutdown system comprising:
   a. a data processing apparatus installed in a vehicle and configured for digital communication with data bus system of a plurality of vehicle, said vehicles having a passive keyless entry and start system, a horn and lights;
   b. a memory associated with the data processing apparatus and configured to receive from an external source digital codes corresponding to vehicle data bus messages from said plurality of vehicles, the messages associated with control of passive keyless entry and start systems, horns and lights;
   c. a communications link between said data bus system, said data processing apparatus and said memory;

wherein said data processing apparatus
   i) monitors data bus system messages associated with the identification of the particular vehicle make and model
   ii) compares the monitored data messages communicated on the data bus with the data messages stored in memory, and
   iii) selects from memory data control messages corresponding to the particular vehicle make and model for controlling the vehicles passive keyless entry and start system, a horn and lights; and
   iv) if the data messages communicated on the data bus are indicative of the absence from the vehicle of the passive keyless entry and start system user proximity indicator and that the engine is idling, generates a user notification command and start a timer, and upon expiration of a set time issues a command selected from memory corresponding to the particular vehicle make and model to the data bus system to shut down the vehicle engine.

2. The engine idle shutdown system of claim 1 further comprising:
   a. a remote start system
   b. at least one connector for allowing communication between the remote start system and the data processing apparatus, wherein the signals received by the data processing apparatus from the remote start system are analog signal and the data processing apparatus converts said analog signals to digital signals capable of being communicated on data bus system and controlling vehicle functions, and wherein the data processing apparatus receives digital signals from the data bus system and converts them to analog signals that can be communicated to the remote start system.

3. The engine idle shutdown system of claim 1 further comprising:
   a wireless transceiver for communicating messages from the system to a receiver in the possession of the driver.

4. The engine idle shutdown system according to claim 1 further comprising:
   a first radio frequency transceiver in direct communication with the data processing apparatus and a second radio frequency transceiver remote from the data processing apparatus, wherein said first and second radio frequency transceivers form a communication link for providing messages to the driver.

5. A method of automated engine shut down in a vehicle having a passive keyless entry and start system comprising the steps of:
   a. monitoring the on/off status of said vehicle;
   b. monitoring whether the vehicle is moving;
   c. monitoring for the present of the a passive keyless entry and start system user proximity indicator associated with said vehicle;
   d. setting an idle run timer when the passive keyless entry and start system user proximity indicator is not present;
   e. setting a user notification timer to provide, when the user notification timer expires, an engine run notice to a user when said passive keyless entry and start system fob is not present;
   f. monitoring an idle run timer and a user notification timer;
   g. providing a digital engine shutdown message to the vehicle if no user proximity indicator is present, no motion is detected and the idle run timer has expired;
   h. providing a user notification of vehicle idling shutdown if no user proximity indicator is present and the user notification timer has expired.

6. The method according to claim 5, wherein the notification method can be a radio frequency transmission, cell phone call, vehicle light flash or vehicle horn honk.

7. A method of driver notification of failed engine shut down for an engine in a vehicle having a passive keyless entry and start system comprising the steps of:
   a. monitoring the on off status of a vehicle engine in a vehicle having a passive keyless entry and start system;
   b. monitoring whether the vehicle is moving;
   c. monitoring for the present of a passive keyless entry and start system user proximity detector;
   d. setting an idle run timer when the passive keyless entry and start system user proximity detector is not present;
   e. setting a user notification timer to provide, when the timer expires, an engine run notice to a user when the passive keyless entry and start system user proximity detector is not present;
   f. monitoring an idle run timer and a user notification timer;
   g. providing a digital engine shutdown message to the vehicle if no user proximity detector is present, no motion is detected and the idle run timer has expired confirming engine shutdown;
   providing a user notification of failure to shut down the vehicle.

8. The method according to claim 7 wherein the monitoring of the vehicle movement is done by reading speed codes on the bus.

9. The method according to claim 7, wherein the notification method can be a radio frequency transmission, cell phone call, vehicle light flash or vehicle horn honk.

10. A method of shutting down an engine in a vehicle having a passive keyless entry and start system comprising the steps of:
   a. monitoring the on off status of a vehicle engine in a vehicle having a passive keyless entry and start system;
   b. monitoring whether the vehicle is moving;
   c. monitoring for the present of a passive keyless entry and start system user proximity detector;
   d. setting an idle run timer when the passive keyless entry and start system user proximity detector is not present;
   e. setting a user notification timer to provide, when the timer expires, an engine run notice to a user when the passive keyless entry and start system user proximity detector is not present;
   f. cancelling an idle run timer and a user notification timer when passive keyless entry and start system user proximity detector is not present;
   g. providing a digital engine shutdown message to a vehicle through the data bus if no motion is detected.

* * * * *